3,334,111
BICYCLODECENONES CONTAINING THREE
HETERO RING MEMBERS
Rudolf G. Griot, Florham Park, N.J., assignor to
Sandoz Inc., Hanover, N.J.
No Drawing. Filed Mar. 4, 1964, Ser. No. 349,492
4 Claims. (Cl. 260—309.6)

This invention concerns compounds of the formulae

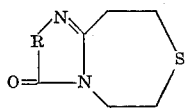

(I)

and

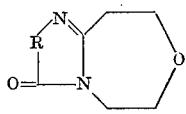

(II)

wherein:

R is the residue of an α-(primary) amino acid, $H_2N$—R—COOH, having only one primary amino group.

These compounds are prepared by reacting any α-(primary)amino carboxylic acid (III) with a lower alkyl lactim ether (IV) to form an amidino acid (V) according to the reaction scheme:

(A)

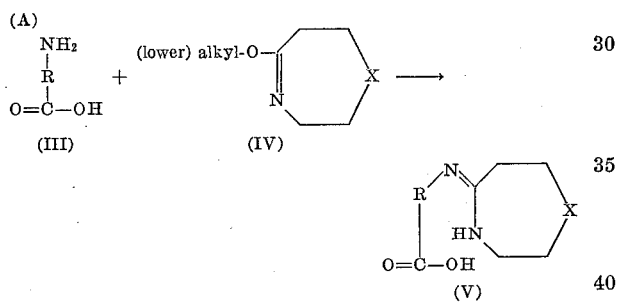

and thereafter effecting ring closure by dehydration according to the reaction scheme:

(B)

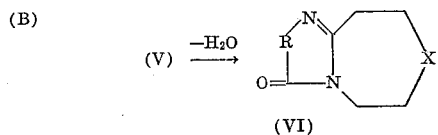

to produce the desired final product.

In Reactions A and B, R has the above-noted meaning; X is either an oxygen or a sulfur atom; and lower alkyl is preferably methyl or ethyl.

In addition to the free bases represented by Formulae I, II, and VI, the therapeutically acceptable acid addition salts (corresponding to said free bases) are also within the contemplation of this invention, as well as the novel amidino acid intermediates V. Exemplary of acids of addition are: hydrochloric acid, salicyclic acid, citric acid, tartaric acid, methanesulfonic acid, paratoluenesulfonic acid, acetic acid, sulfonic acid, maleic acid and oxalic acid. The acid addition salts are prepared from the free bases VI in accord with well known analogous procedures.

Exemplary of R is each of the corresponding residues of the α-(primary)amino monocarboxylic acids, $H_2N$—R—COOH, enumerated in Fieser, Louis F., and Fieser, Mary, "Organic Chemistry," Table I, page 405 and 406, D. C. Health and Company, 1944, and which contain only one primary amino group.

The final products (compounds VI) of this invention and their therapeutically acceptable acid addition salts are useful as phychic energizers (evidenced by monamine oxidase inhibiting activity) and antihypertensives. In addition compounds I are mood stabilizers and compounds II are diuretics and antiinflammatory agents. They can be administered either orally or parentally in doses of as much as 300 milligrams per day.

Compounds VI and therapeutically acceptable acid addition salts thereof are also useful as intermediates in the preparation of saturated compounds of the structure

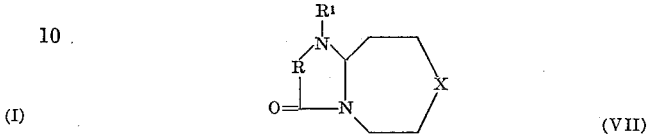

(VII)

according to the reactions:

(C)

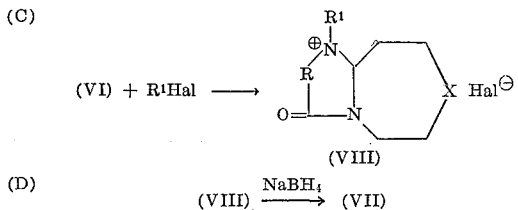

(D)

(VIII) $\xrightarrow{NaBH_4}$ (VII)

wherein:

$R^1$ is hydrogen (—H); lower alkyl, e.g. methyl, isopropyl, butyl and hexyl; phenyl; or phenyl(lower)alkyl, e.g. benzyl;

Hal is either chlorine (—Cl), bromine (—Br) or iodine (—I); and

Each of R and X has the same meaning as hereinbefore defined.

Compounds VI are also hydrogenated in an inert solvent according to well-known procedures with a suitable catalyst:

(E)

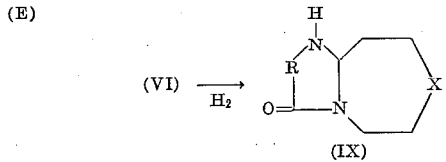

Compounds IX are further useful according to the reaction:

(F)

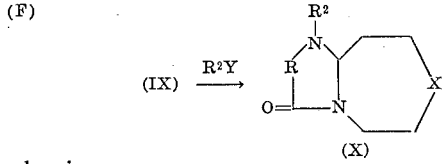

wherein:

$R^2$ is either hydrocarbon [saturated—lower alkyl, e.g. propyl; ethylenically unsaturated lower aliphatic, e.g. allyl; acetylenically unsaturated lower aliphatic, e.g. propargyl; monocarbocyclic ar(lower)alkyl, e.g. benzyl] or carboxylic acid acyl [unsubstituted phenyl-keto-(lower)alkyl; e.g. phenyl-keto-propyl; substituted phenyl-keto-(lower)alkyl, e.g. p-fluorophenyl-keto-propyl]; Y is either chlorine (—Cl) or bromine (—Br); and each of R and X has the same meaning as hereinbefore defined.

Compounds (VII), (IX) and (X) and their pharmaceutically acceptable acid addition salts are useful in the same manner and for the same therapeutic purpose as compounds (VI). The acid addition salts are prepared, according to well-known procedures, by neutralizing a solution of the free base with the acid of addition.

The following examples illustrate the invention, the parts and percentages being by weight unless otherwise stated, and the relationship of parts by weight to parts by volume being the same as that of the kilogram to the liter. All temperatures are in degree centigrade.

*Example 1*

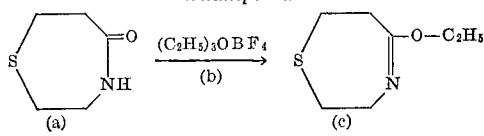

Add, at room temperature (20°), 15.1 parts of lactam (a)—see: Jakob, F., and Schlack, P., "Chem. Ber.," 96 88, (1963)—to a stirred solution of triethyloxonium-fluoroborate (b)—see: Meerwein, H., et al., "J. Prakt. Chem." (2), 147,257, (1937); Meerwein, H., et al., "J. Prakt. Chem." (2), 154, 83, (1940)—(prepared from 10 parts of chlorohydrine and 22 parts of boron trifluoride etherate) in 50 parts by volume of methylenechloride, and stir the resultant at room temperature for 14 hours. A complex salt of (c) precipitates. Filter same. Recover unreacted (a)—about 6.5 parts—from the filtrate.

Wash the collected complex salt of (c) with 3 parts by volume of saturated aqueous potassium carbonate solution, and extract compound (c) from the product with methylene chloride.

Dry, evaporate solvent from dried basic solution. Distil remaining oil in vacuo, boiling point (B.P.) 100° to 102°/12 mm. The yield of compound (c) thus obtained is 6.7 parts.

Infrared spectra reveal strong absorption at 1670 cm.$^{-1}$, significant of $>C=N-$. An elemental analysis for $C_7H_{13}NOS$ provides the following comparison:

Calculated, percent: C, 52.8; H, 8.2; N, 8.8; S, 20.1. Found, percent: C, 52.8; H, 8.4; N, 8.9; S, 19.1.

*Example 2*

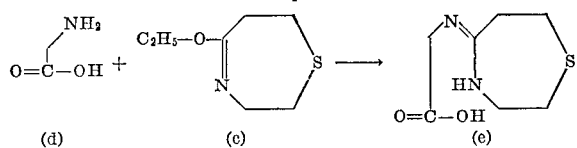

Mix 50 parts of lactim ether (c) and 2.5 parts of glycine (d) with 20 parts by volume of methanol, and stir the resultant at room temperature overnight (15 to 17 hours).

Reaction product (e) precipitates. Filter (e) and recrystallize same three times from hot methanol. A yield of 3 parts of (e), melting point (M.P.) 198°, is thus obtained.

An elemental analysis for $C_7H_{12}N_2O_2S$ provides the following comparison:

Calculated, percent: C, 44.7; H, 6.4; N, 14.9; O, 17.0; S, 17.0. Found, percent: C, 44.5; H, 6.7; N, 14.4; O, 17.3; S, 17.0.

*Example 3.—4-thia-1,8-diaza-bicyclo(5,3,0)-decen-$\Delta^{7,8}$-10-one*

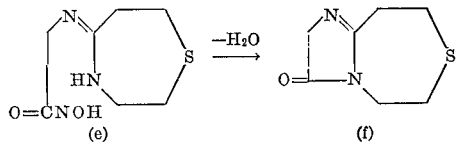

Suspend 3.0 parts of compound (e) in toluene, and add 0.10 part of paratoluenesulfonic acid to the resulting suspension. Reflux for three hours. Evaporate the solvent, leaving a thick yellow oil, which crystallizes. Purify by sublimation in vacuo. A yield of 1 part of compound (f), M.P. 86°, is thus obtained.

Infrared spectra reveal absorption at 1730 cm.$^{-1}$ (indicative of $>C=O$) and at 1645 cm.$^{-1}$ (indicative of $>C=N-$). An elemental analysis for $C_7H_{10}N_2OS$ provides the following comparison:

Calculated, percent: N, 16.5; O, 9.4; S, 18.8. Found, percent: N, 16.2; O, 9.9; S, 18.7.

An elemental analysis of the corresponding hydrochloride, $C_7H_{11}ClN_2OS$, prepared from compound (f) by standard procedures (neutralization of base with isopropanolic solution of hydrogen chloride) provides the further comparison:

Calculated, percent: Cl, 17.2; S, 15.5. Found, percent: Cl, 17.2; S, 15.5.

*Example 4*

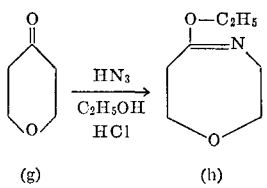

At 40° add 7.5 parts of tetrahydro-γ-pyrone, [Faberov, M. I., et al. "J. Gen. Chem. of the U.S.S.R.," 25, 119 (1955)], (g) and a solution of 6.5 parts of $HN_3$ (hydrazoic acid) in 100 parts by volume of chloroform slowly to 25 parts by volume of ethanol (saturated with hydrogen chloride). Complete the addition within three hours. When the evolution of nitrogen ceases, evaporate the resultant to dryness in vacuo. The hydrochloride of lactim ether (h) thus crystallizes. Recrystallize from absolute ethanol/diethylether to obtain 2.2 parts of the pure hydrochloride, M.P. 123° to 124°.

An elemental analysis for $C_7H_{14}NO_4Cl_2$ provides the following comparison:

Calculated, percent: C, 46.8; H, 7.9; N, 7.8; Cl, 19.7. Found, percent: C, 46.4; H, 8.0; N, 8.2; Cl, 19.4.

The base (h) is set free from its hydrochloride by dissolving the hydrochloride in aqueous potassium carbonate ($K_2CO_3$) solution, and extracting the resultant with chloroform. On evaporation of the solvent, the free base (h) remains. Distil said free base in vacuo, B.P. 70.5°/11 mm.

Infrared spectra (5% chloroform) reveals strong absorption at 1680 cm.$^{-1}$ (indicative of $>C=$). An elemental analysis for $C_7H_{13}NO_2$ provides the following comparsion:

Calculated, percent: N, 9.8. Found, percent: N, 9.4.

*Example 5*

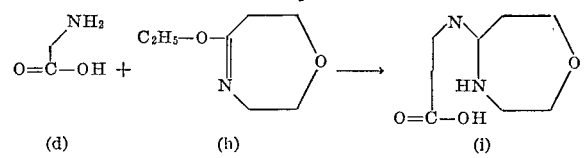

Admix 2.0 parts of the hydrochloride of (h) with saturated (aq.) potassium carbonate solution. Extract the product with diethylether. Evaporate the solvent to obtain the lactim ether (h).

Dissolve said lactim ether (h) in 20 parts by volume of methanol. Admix 5 parts of glycine (d) with the methanolic solution of (h). Stir the admixture of 14 hours at 20°. Concentrate and filter. Recrystallize the produced solids from methanol. There are thus obtained 0.6 parts of compound (i), M.P. 174° to 175° (dec.).

An elemental analysis for $C_7H_{12}N_2O_3$ provides the following comparison:

Calculated, percent: C, 48.8; N, 16.3; H, 7.0. Found, percent: C, 48.5; N, 15.9; H, 7.4.

*Example 6*

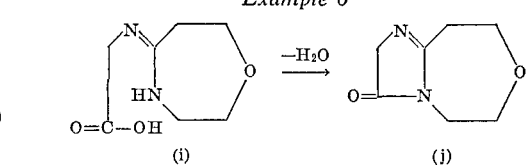

Reflux 0.6 part of amidino acid (i) in xylene containing a trace of paratoluenesulfonic acid. After separating out some water, the refluxing suspension becomes a yellow solution. Decant the yellow solution from insolubles present therein, and evaporate said solution to dryness. The base (j) crystallizes. Filter said base and wash same with cyclohexane. Recrystallize from absolute ethanol. A yield of 0.6 part of (j), M.P. 111° to 112°, is thus obtained.

Infrared spectra (5% in methylene chloride) reveal strong absorption at 1735 cm.$^{-1}$ (indicative of ring >C=O) and medium absorption at 1650 cm.$^{-1}$ (indicative of >C=N—). An elemental analysis for $C_7H_{10}N_2O_2$ provides the following comparison:

Calculated, percent: C, 54.5; H, 6.5; N, 18.2; O, 20.8. Found, percent: C, 54.8; H, 6.7; N, 18.2; O, 20.8.

The hydrochloride of (j), prepared according to standard procedures, has a melting point of 216° to 217°, with decomposition. The elemental analysis of the hydrochloride, $C_7H_{11}ClN_2O$ provides the comparative data:

Calculated, percent: N, 14.7; Cl, 18.6. Found, percent: N, 14.5; Cl, 18.3.

It is thought that the invention and its advantages will be understood from the foregoing description. It is apparent that various changes may be made in the processes, the intermediates and in the final products without departing from the spirit and scope of the invention or sacrificing its material advantages, the processes, intermediates, free bases and acid addition salts hereinbefore described being merely illustrative embodiments.

What is claimed is:
1. A compound of the formula

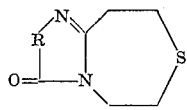

wherein R is that moiety of an α-amino acid which is free of primary amino and carboxylic acid groups, the α-amino acid being one which is derived from protein.

2. The compound of the formula

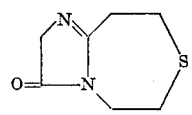

3. A compound of the formula

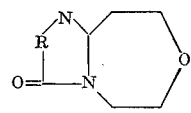

wherein R is that moiety of an α-amino acid which is free of primary amino and carboxylic acid groups, the α-amino acid being one which is derived from protein.

4. The compound of the formula

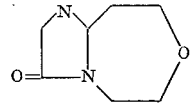

References Cited
UNITED STATES PATENTS
3,002,000   9/1961   Tietze et al. _____ 260—309.6
FOREIGN PATENTS
1,082,268   10/1962   Germany.
OTHER REFERENCES
Petersen et al.: Liebigs Annalen der Chemie, vol. 623, pages 166–76 (1959).

WALTER A. MODANCE, *Primary Examiner.*
N. TROUSOF, *Assistant Examiner.*